US010962465B2

(12) United States Patent
Adam et al.

(10) Patent No.: US 10,962,465 B2
(45) Date of Patent: Mar. 30, 2021

(54) DEVICE FOR CHECKING FILTER TESTING SYSTEMS

(71) Applicant: Topas GmbH Technologie-orientierte Partikel-, Analysen- und Sensortechnik, Dresden (DE)

(72) Inventors: Rene Adam, Dresden (DE); Andreas Rudolph, Dresden (DE); Franziska Mayer, Dresden (DE); Stephan List, Dresden (DE)

(73) Assignee: Topas GmbH, Dresden (DE)

( * ) Notice: Subject to any disclaimer, the term of this patent is extended or adjusted under 35 U.S.C. 154(b) by 176 days.

(21) Appl. No.: 16/260,167

(22) Filed: Jan. 29, 2019

(65) Prior Publication Data

US 2019/0234857 A1  Aug. 1, 2019

(30) Foreign Application Priority Data

Jan. 31, 2018 (DE) .......................... 102018102128.3
Jan. 28, 2019 (DE) .......................... 102019101993.1

(51) Int. Cl.
*G01N 15/08* (2006.01)
*B60H 3/06* (2006.01)
*G01N 1/38* (2006.01)

(52) U.S. Cl.
CPC .......... *G01N 15/0826* (2013.01); *B60H 3/06* (2013.01); *G01N 1/38* (2013.01); *B01D 2273/18* (2013.01); *G01N 2015/084* (2013.01)

(58) Field of Classification Search
CPC .............................................. G01N 2015/084
See application file for complete search history.

(56) References Cited

U.S. PATENT DOCUMENTS

| 3,392,573 | A |   | 7/1968 | Benson |  |
|---|---|---|---|---|---|
| 4,449,392 | A | * | 5/1984 | Huschke | B01D 65/102 73/40 |
| 4,614,109 | A | * | 9/1986 | Hofmann | B01D 65/102 73/38 |

(Continued)

FOREIGN PATENT DOCUMENTS

| DE |     29905469 U1 | 8/1999 |
|---|---|---|
| DE | 102014213232 A1 | 1/2016 |

(Continued)

*Primary Examiner* — David A. Rogers
(74) *Attorney, Agent, or Firm* — Michael Soderman

(57) ABSTRACT

Devices to determine the filtration behavior of a device for filtering gaseous fluid. These devices are characterized by unchanged reproducibility during further tests. To this end, the device comprises
  a first device for setting a particular differential pressure,
  a second device having a certain degree of filtration efficiency of the gaseous fluid, which flows through the devices, of the filter test system such that a differential pressure and/or filtration efficiency are adjustable in a variable fashion and independently of one another,
and the first device (2) and the second device (3) are normal for filtration,
with permanently constant characteristics with regard to the differential pressure that is set and the filtration efficiency that is set as a reference device for simulation of a filtering separator,
  a first adapter for coupling on the inflow side, and
  a second adapter for coupling on the outflow side.

12 Claims, 3 Drawing Sheets

(56) References Cited

U.S. PATENT DOCUMENTS

| | | | | |
|---|---|---|---|---|
| 4,701,861 A * | 10/1987 | Kauke | ............... | G01M 3/20 |
| | | | | 210/321.72 |
| 4,872,974 A * | 10/1989 | Hirayama | ............... | A61L 2/022 |
| | | | | 210/90 |
| 4,881,176 A * | 11/1989 | Kononov | ............... | B01D 46/10 |
| | | | | 700/271 |
| 4,963,289 A | 10/1990 | Ortiz et al. | | |
| 5,064,529 A * | 11/1991 | Hirayama | ............... | B01D 61/18 |
| | | | | 210/90 |
| 5,282,380 A * | 2/1994 | DiLeo | ............... | B01D 65/102 |
| | | | | 73/38 |
| 5,353,630 A * | 10/1994 | Soda | ............... | B01D 65/102 |
| | | | | 73/38 |
| 5,417,101 A * | 5/1995 | Weich | ............... | B01D 29/114 |
| | | | | 73/38 |
| 5,576,480 A * | 11/1996 | Hopkins | ............... | B01D 65/102 |
| | | | | 73/38 |
| 5,594,161 A * | 1/1997 | Randhahn | ............... | B01D 29/114 |
| | | | | 73/38 |
| 5,616,828 A * | 4/1997 | Kuczenski | ............... | B01D 65/102 |
| | | | | 73/38 |
| 5,674,404 A * | 10/1997 | Kenley | ............... | A61L 2/04 |
| | | | | 210/741 |
| 5,808,181 A * | 9/1998 | Wamsiedler | ............... | A61M 1/3465 |
| | | | | 210/646 |
| 6,527,146 B1 * | 3/2003 | Tanny | ............... | A61L 2/022 |
| | | | | 222/189.11 |
| 6,568,282 B1 * | 5/2003 | Ganzi | ............... | B01D 65/102 |
| | | | | 73/38 |
| 6,619,112 B2 * | 9/2003 | Juhasz | ............... | B01D 46/44 |
| | | | | 73/168 |
| 6,907,770 B2 * | 6/2005 | Von Der Hardt | ............... | G01N 15/0826 |
| | | | | 73/38 |
| 7,587,927 B2 * | 9/2009 | Burke | ............... | B01D 65/102 |
| | | | | 73/38 |
| 7,594,425 B2 * | 9/2009 | Lewnard | ............... | B01D 53/228 |
| | | | | 73/38 |
| 9,304,521 B2 * | 4/2016 | Kates | ............... | G01N 15/0826 |
| 9,999,908 B2 * | 6/2018 | Dobbyn | ............... | B08B 15/023 |
| 10,376,844 B2 * | 8/2019 | Adhikari | ............... | B01D 65/10 |
| 10,724,418 B2 * | 7/2020 | Karpe | ............... | G01N 15/0826 |
| 2002/0195145 A1 * | 12/2002 | Lowery | ............... | G05D 7/0635 |
| | | | | 137/487.5 |
| 2010/0017148 A1 * | 1/2010 | Bos | ............... | B01D 46/442 |
| | | | | 702/24 |
| 2012/0260804 A1 * | 10/2012 | Kates | ............... | G05D 23/1928 |
| | | | | 96/421 |
| 2017/0189858 A1 * | 7/2017 | Armgart | ............... | G01F 15/125 |
| 2017/0252703 A1 * | 9/2017 | Adhikari | ............... | B01D 65/104 |
| 2018/0087431 A1 * | 3/2018 | Karpe | ............... | F01N 13/009 |
| 2020/0054974 A1 * | 2/2020 | Karaila | ............... | B01D 29/002 |

FOREIGN PATENT DOCUMENTS

| | | | | |
|---|---|---|---|---|
| DE | 202016102610 U1 | 7/2016 | | |
| GB | 2411137 A | 8/2005 | | |
| WO | WO-0139870 A3 * | 12/2001 | ............... | B01D 65/102 |

\* cited by examiner

DEVICE FOR CHECKING FILTER TESTING SYSTEMS

CROSS REFERENCE TO RELATED APPLICATIONS

This application claims the priority of DE 102018102128.3 filed on 2018 Jan. 31 and DE 102019101993.1 filed on 2019 Jan. 28; these applications are incorporated by reference herein in their entirety.

BACKGROUND

The invention relates to devices for testing filter test systems in order to determine the filtration behavior of a device for filtering gaseous fluids.

It is known to use filters to remove unwanted admixtures from fluid flows. The filtration behavior is characterized by the resultant pressure difference as the fluid flows through the filter and the filtration efficiency. The filtration efficiency allows for statements regarding the proportion of admixtures that are separated with respect to the amount fed in.

When used for gas filtration and the highly efficient separation of even very small solid particles or droplets of liquid, these filters are referred to as high-efficiency particulate air filters. These filters are often used in critical applications, such as in clean room technology, bioengineering or nuclear technology. This often results in the need for a certain minimum filtration efficiency to be reliably reached under all circumstances. Establishing the filtration efficiency of such a filter therefore makes it possible to classify filters and to check the quality of specific filter specimens.

In this respect, the quality of a device for testing the filtration behavior of a filter is particularly important in that said device itself should likewise be checked, tested or validated. A device for testing the filtration behavior of a filter measures the proportion of filtered test material, in this case particulate admixtures, when a gaseous fluid flows through the filter, and the differential pressure. The test device generally consists of the following function blocks: conveying and processing the gas flow, measuring the flow of gas, generating and supplying the test material, measuring the test material concentration on both the inflow and outflow side of the filter and measuring device for the differential pressure.

Validating such a test device that is very complex, which involves independently validating all the function blocks, is both technically and economically disadvantageous. The test device can be validated in a simpler manner by testing a test specimen having a standardized filtration efficiency as the filter normal or filtration normal and comparing the result of the test with the target filtration efficiency and differential pressure values for a certain flow of fluid.

The normal is therefore particularly important, since it must first be tested in a validated test device in order to obtain the target values for the filtration behavior and its filtration behavior must then remain completely unchanged for all other tests carried out. This is never the case for filters or filter materials used for this purpose, since the filtration behavior is changed by test material that is functionally incorporated.

The main effect of the filtration efficiency of a filter is the decrease in the content of a test material in a fluid flow. One indication of a particular preset degree of filtration efficiency is therefore the defined decrease in the concentration of a test material in a fluid flow.

Apparatuses are known that are used for this purpose to adapt a measuring instrument, the measuring range of which is limited, for an aerosol concentration.

DE 20 2008 013 327 U1 therefore discloses an aerosol source system having aerosol vents for a uniform distribution of aerosol from an aerosol generator in the surrounding area for test purposes, which system does not meet the requirement in respect of the continuity of the fluid flow by means of a plurality of vents.

DE 10 2014 200 823 A1 discloses a device for producing an adjustable differential pressure for a compressible medium when a fluid flow itself passes therethrough.

A dilution device for sample-taking in highly concentrated aerosols, which substantially consists of a capillary and a filter, is known per se from DE 296 10 043 U1. Another dilution device is disclosed by DE 10 2008 047 404 A1 as a device to be arranged upstream of a particle counter for the self-contained dilution of aerosols. This device substantially comprises a capillary and a filter in conjunction with a gas-tight conveying device, which is connected to a control device.

SUMMARY

The invention relates to devices for testing filter test systems in order to determine the filtration behavior of a device for filtering gaseous fluid.

The devices for testing filter test systems in order to determine the filtration behavior of a device for filtering gaseous fluids are characterized in particular in that the reproducibility remains unchanged during further tests. For this purpose, the device comprises
  a differential pressure regulator,
  a filtration efficiency regulator, having a certain degree of filtration efficiency of the gaseous fluid, which flows through the devices, of the filter test system such that a differential pressure and/or filtration efficiency are adjustable in a variable fashion and independently of one another,
and the differential pressure regulator (2) and the filtration efficiency regulator (3) are normal for filtration,
with permanently constant characteristics with regard to the differential pressure that is set and the filtration efficiency that is set as a reference device for simulation of a filtering separator,
  a first coupler for coupling the devices to the filter test system on the inflow side, and
  a second coupler for coupling the devices to the filter test system on the outflow side.

DETAILED DESCRIPTION

The object of the invention is that of providing a device for testing filter test systems such that the reproducibility remains unchanged during further tests.

This object is achieved by the features set out here.

The devices for testing filter test systems in order to determine the filtration behavior of a device for filtering gaseous fluids is characterized in particular in that the reproducibility remains unchanged for further tests.

For this purpose, the device comprises
  a differential pressure regulator,
  a filtration efficiency regulator, having a certain degree of filtration efficiency of the gaseous fluid, which flows through the devices, of the filter test system such that a differential pressure and/or filtration efficiency can be set in a variable fashion and independently of one another and the differential pressure regulator and the filtration efficiency regulator are normal for filtration or filters with permanently constant characteristics with regard to the differential pressure that is set and the filtration efficiency that is set as a reference device for simulation of a filtering separator, a first coupler for coupling the devices to the filter test system on the inflow side, and a second coupler for coupling the devices to the filter test system on the outflow side.

The device for testing filter test systems therefore allows for simple validation of filter test devices.

The adaptation to the particular filter test device constitutes one function block. This function block ensures the fluid-tight connection of additional function blocks to the filter test device. Since test devices are naturally adapted to the type of filter to be tested in each case, it is necessary to always have a specific design in this case. However, a corresponding requirement is that of designing the test devices such that, when a fluid flows through, a pressure difference is present that is negligible in comparison with the pressure difference of the differential pressure regulator and the filtration efficiency regulator. If this requirement is fulfilled, this function block does not falsify the validation of the differential pressure measurement that functions as a component of the filter test device. The adaptation function block consists of two parts of the adaptation of the filter receptacles, which belong to the test device and are arranged on the inflow side and on the outflow side.

Furthermore, the device for testing filter test systems comprises the additional function blocks of displaying the filtration efficiency and the differential pressure, which are arranged between the adaptations in the direction of flow.

The device for testing filter test systems and therefore for validating filter test devices is therefore based on imitating known filtration behavior of a filter, which consists of the filtration efficiency and the differential pressure when a fluid flows therethrough. For this purpose, the measured values for the filtration behavior, determined using the filter test device, are compared with the target values for these parameters. If the deviations are within permissible limits, the validation is considered to have been passed.

The device for testing filter test systems has to this end the differential pressure regulator and the filtration efficiency regulator, having a certain degree of filtration efficiency of the gaseous fluid, which flows through the devices, of the filter test system. A structural and functional separation of the differential pressure and the filtration efficiency as therefore been realized. This is in contrast to a customary filter that always comprises a combined function. This separation leads in a favorable way to an adjustment capability of a differential pressure with a high level of reproducibility that is independent in terms of time and in terms of the separation of filtered particles to an adjustment capability of a variable filtration efficiency, in contrast to a customary filter with a specified filtration efficiency, and to filtration efficiency with a high level of reproducibility that is independent in terms of time and in terms of the separation of filtered particles and therefore to a reference device with filtration efficiency that is stable over a long period of time with permanently constant characteristics with regard to the differential pressure that is set and the filtration efficiency that is set for simulation of a filtering separator.

Variable adjustment of a differential pressure and of filtration efficiency and a free combination thereof are therefore provided. A specific level of filtration can be simulated, because it is presented in a separate way from the differential pressure and is independent of separated, filtered particles.

The device for testing filter test systems also replicates the mechanical connections of the filter test system to be tested in each case such that the filter test system to be validated can be validated very easily and without any changes to said system.

Advantageous embodiments of the invention are also described.

According to one embodiment, the differential pressure regulator is at least one diaphragm and/or a device that conveys the gaseous fluid.

The diaphragm and/or the conveying device is/are used to influence the flow speed of the gaseous fluid such that the differential pressure can be changed easily and significantly. For this purpose, the diaphragm can be a slit diaphragm or an iris diaphragm, the cross section of which can be adapted either manually or mechanically. A known pump can be a gas-conveying device.

According to another embodiment, the filtration efficiency regulator is a dilution device of the gaseous fluid.

In a further embodiment, the dilution device comprises a parallel arrangement of a flow resistor through which particles can pass and a filter, a specific volumetric flow rate of the gaseous fluid flowing through the flow resistor through which particles can pass and the diluting factor determining the filtration efficiency. The dilution device therefore replicates the character of a filter having a known degree of filtration efficiency.

In another development, the filter is a filter that removes either most or all of the particles of the gaseous fluid.

In connection with features in further developments, the devices for testing filter test systems meet the requirement in respect of the continuity of the fluid flow. This is intended to mean that such an arrangement comprises just one input and one output for the fluid and the same amount of fluid flow that enters the arrangement also leaves it. This property replicates the behavior of a filter.

The functional principle constitutes a parallel connection of a flow resistor for a fluid, which allows an aerosol to pass such that the concentration of particles thereof remains as unaffected as possible, and a filter, which removes all the particles from the fluid flow if possible. The reduction in the concentration of particles corresponds to the dilution factor, formed from the ratio of the summary flow of fluid to the partial fluid flow through the flow resistor. It is known to set the partial flow through the flow resistor to a preset value using a differential pressure measurement on the flow resistor. This is based on the relationship that a mechanically defined component through which a fluid flows generates a certain differential pressure, depending on the fluid flow.

The dilution factor can be directly converted into a degree of filtration efficiency and therefore replicates the character of a filter having a known degree of filtration efficiency.

By equalizing the differential pressure at the flow resistor, when a fluid flows through, this arrangement always has a known, constant differential pressure with regard to the fluid input and fluid output.

This arrangement is integrated in the device for testing filter test systems as a function block. If the differential pressure of the “adaptation” function block is negligible compared with in the ratio, the pressure difference of the function block therefore takes effect as the differential pressure as far as the point for measuring the filter differential pressure in the filter test system to be validated. A known filter differential pressure is therefore mirrored.

As a further option, a differential pressure gauge is interposed between the input and the output of the dilution device.

In another development, a differential pressure gauge is interposed between the input and the output of the parallel arrangement.

According to a further embodiment, a valve arrangement and/or a fan is/are series-connected to the filter. In particular, the pressure in the filter of the dilution device can advantageously be compensated for by means of the fan.

As another option, the differential pressure gauge and an actuation device of the valve arrangement are connected to a data processing system.

In a further development, the differential pressure gauge, an actuation device of the valve arrangement and the diaphragm and/or the device that conveys the gaseous fluid are connected to a data processing system.

In a further option, the data processing system is a data processing system that establishes the filtration behavior from the filtration efficiency and the differential pressure.

And as another development, the data processing system is a data processing system that compares the actual value assigned to the filtration behavior with target values such that a statement is made regarding the function of the filter test system.

BRIEF DESCRIPTION OF THE DRAWINGS

One embodiment of the invention is shown schematically in each of the figures and will be described in more detail in the following, in which.

DETAILED DESCRIPTION OF THE PREFERRED EMBODIMENTS

A device for testing filter test systems in order to determine the filtration behavior of a device for filtering gaseous fluids substantially consists of a first coupler 1, a second coupler 4, a differential pressure regulator 2 and a filtration efficiency regulator 3 having a certain degree of filtration efficiency.

Figure 1:
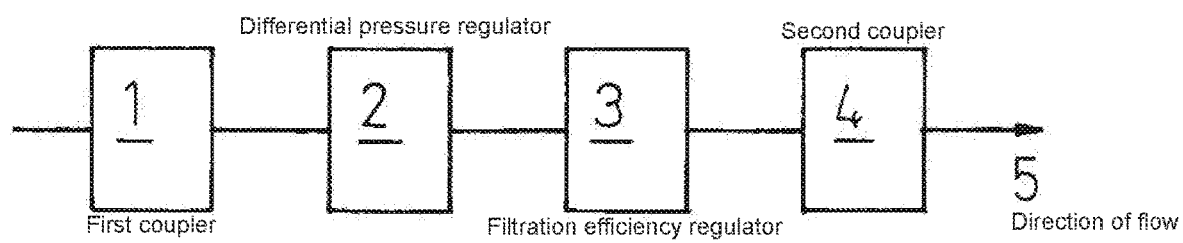
FIG. 1 is a block diagram of a device for testing filter test systems in order to determine the filtration behavior of a device for filtering gaseous fluids.

FIG. 1 is a schematic block diagram of a device for testing filter test systems in order to determine the filtration behavior of a device for filtering gaseous fluids.

In the direction of flow 5 of the gaseous fluid in the filter test system to be tested, the following are arranged:
the first coupler 1 for coupling the filter test system on the inflow side,
the differential pressure regulator 2,
the filtration efficiency regulator 3 having a certain degree of filtration efficiency, and
the second coupler 4 for coupling the filter test system on the outflow side. The differential pressure regulator 2 and the filtration efficiency regulator 3 are normal for filtration or filters.

The differential pressure regulator 2 and the filtration efficiency regulator 3 are therefore a filtration normal with permanently constant characteristics with regard to the differential pressure that is set and the filtration efficiency that is set as a reference device for simulation of a filtering separator; a differential pressure and/or filtration efficiency can be set in a variable fashion and independently of one another.

For this purpose, the differential pressure regulator can be at least one diaphragm and/or a device that conveys the gaseous fluid.

Figure 2:
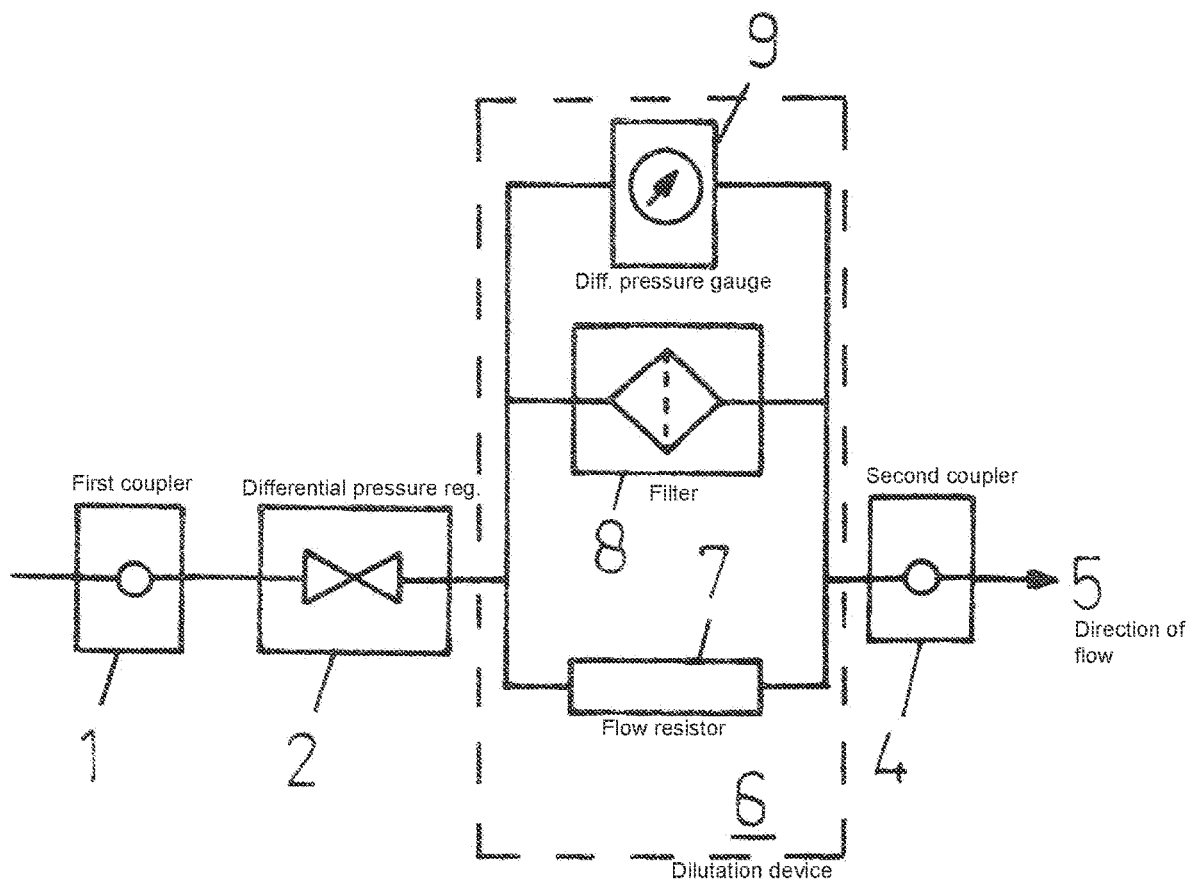
FIG. 2 shows a device for testing filter test systems, comprising a dilution device.

FIG. 2 is a schematic view of a device for testing filter test systems having a dilution device 6.

In one embodiment, the filtration efficiency regulator 3 is a device 6 for diluting the gaseous fluid.

For this purpose, the dilution device 6 can be a parallel arrangement of a flow resistor 7 through which particles can pass, for example in the form of a capillary, and a filter 8, which removes either most or all of the particles of the gaseous fluid. For this purpose, the flow resistor 7 through which particles can pass can be, in particular, a capillary. A specific volumetric flow rate of the gaseous fluid flows through the flow resistor 7, through which particles can pass, such that said flow resistor determines the dilution factor and therefore the filtration efficiency. The dilution device 6 thus mirrors the property of a filter having a known degree of filtration efficiency. A differential pressure gauge 9 is interposed between the input and the output of the dilution device 6.

Figure 3:
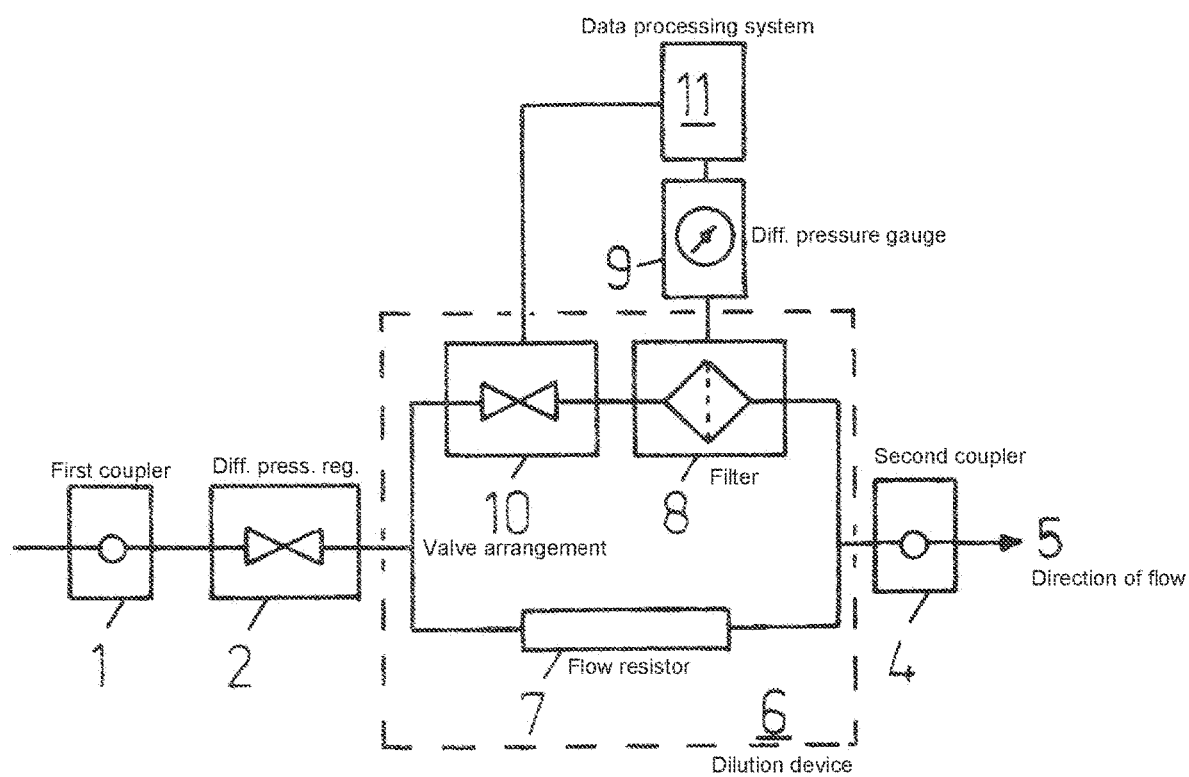
FIG. 3 shows a device for testing filter test systems, comprising a valve arrangement in the dilution device.

FIG. 3 is a schematic view of a device for testing filter test systems, comprising a valve arrangement 10 in the dilution device 6.

In another embodiment, a valve arrangement 10 can be series-connected to the filter 8. The differential pressure gauge 9 and an actuation device of the valve arrangement 10 are connected to a data processing system 11.

Furthermore, the diaphragm and/or the device of the differential pressure regulator 2 that conveys the gaseous fluid can also be connected to the data processing system 11.

The data processing system 11 is a data processing system 11 that establishes the filtration behavior from the filtration efficiency and the differential pressure and can also compare an actual value that is assigned to the filtration behavior with target values in order to make a statement regarding the function of the filter test system.

LIST OF REFERENCE NUMERALS 1 first coupler
2 differential pressure regulator
3 filtration efficiency regulator
4 second coupler
5 direction of flow of the gaseous fluid
6 dilution device
7 flow resistor through which particles can pass
8 filter
9 differential pressure gauge
10 valve arrangement
11 data processing system

The invention claimed is:

1. Device for checking filter test systems in order to determine the filtration behavior of a device for filtering gaseous fluid, comprising
a differential pressure regulator (2),
a filtration efficiency regulator (3) having a certain degree of filtration efficiency of the gaseous fluid, which flows through the devices (2, 3), of the filter test system such that
a differential pressure and/or filtration efficiency are adjustable in a variable fashion and independently of one another, and the differential pressure regulator (2) and the filtration efficiency regulator (3) are normal for filtration,
with permanently constant characteristics with regard to the differential pressure that is set and the filtration efficiency that is set as a reference device for simulation of a filtering separator,
  a first coupler (1) for coupling the devices (2, 3) to the filter test system on the inflow side, and
  a second coupler (4) for coupling the devices (2, 3) to the filter test system on the outflow side.

2. Device according to claim 1, characterized in that the differential pressure regulator (2) is at least one diaphragm and/or a device that conveys the gaseous fluid.

3. Device according to claim 2, characterized in that the differential pressure gauge (9), an actuation device of the valve arrangement (10) and the diaphragm and/or the device conveying the gaseous fluid are connected to a data processing system (11).

4. Device according to claim 1, characterized in that the filtration efficiency regulator (3) is a device (6) for diluting the gaseous fluid.

5. Device according to claim 4, characterized in that the dilution device (6) comprises a parallel arrangement of a flow resistor (7) through which particles can pass and a filter (8), a specific volumetric flow rate of the gaseous fluid flowing through the flow resistor (7) through which particles can pass and the diluting factor determining the filtration efficiency such that the dilution device replicates the character of a filter having a known degree of filtration efficiency.

6. Device according to claim 5, characterized in that the filter (8) is a filter (8) that removes substantially all of the particles of the gaseous fluid.

7. Device according to claim 5, characterized in that a differential pressure gauge (9) is interposed between the input and the output of the parallel arrangement.

8. Device according to claim 5, characterized in that a valve arrangement (10) and/or a fan is/are series-connected to the filter (8).

9. Device according to claim 4, characterized in that a differential pressure gauge (9) is interposed between the input and the output of the dilution device (6).

10. Device according to claim 9, characterized in that the differential pressure gauge (9) and an actuation device of the valve arrangement (10) are connected to a data processing system (11).

11. Device according to claim 1, characterized in that the data processing system (11) is a data processing system (11) that establishes the filtration behavior from the filtration efficiency and the differential pressure.

12. Device according to claim 11, characterized in that the data processing system (11) is a data processing system (11) that compares an actual value assigned to the filtration behavior with target values such that a statement is made regarding the function of the filter test system.

* * * * *